(12) United States Patent
Hu

(10) Patent No.: US 11,921,663 B2
(45) Date of Patent: Mar. 5, 2024

(54) ELECTRONIC APPARATUS AND USB INTERFACE SWITCHING METHOD

(71) Applicants: K TRONICS (SUZHOU) TECHNOLOGY CO., LTD., Jiangsu (CN); BOE Technology Group Co., Ltd., Beijing (CN)

(72) Inventor: Zejian Hu, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/995,146

(22) PCT Filed: Aug. 4, 2021

(86) PCT No.: PCT/CN2021/110669
§ 371 (c)(1),
(2) Date: Sep. 30, 2022

(87) PCT Pub. No.: WO2022/057488
PCT Pub. Date: Mar. 24, 2022

(65) Prior Publication Data
US 2023/0222078 A1 Jul. 13, 2023

(30) Foreign Application Priority Data

Sep. 18, 2020 (CN) .......................... 202010987327.8

(51) Int. Cl.
*G06F 13/40* (2006.01)
(52) U.S. Cl.
CPC .. *G06F 13/4022* (2013.01); *G06F 2213/0042* (2013.01)

(58) Field of Classification Search
CPC .................... G06F 13/4022; G06F 2213/0042
See application file for complete search history.

(56) References Cited

U.S. PATENT DOCUMENTS 6,327,253 B1 * 12/2001 Frink ..................... H04N 5/268
370/231
2001/0032280 A1 10/2001 Osakada et al.
(Continued)

FOREIGN PATENT DOCUMENTS

CN 103778079 A 5/2014
CN 203909657 U 10/2014
(Continued)

OTHER PUBLICATIONS

Dazhi, et al., "Research and application of the functional verification based on USB2.0 IP core", Electronic Measurement Technology, Apr. 2009, pp. 75-79.
(Continued)

*Primary Examiner* — Faisal M Zaman
(74) *Attorney, Agent, or Firm* — Workman Nydegger

(57) ABSTRACT

An electronic apparatus and a USB interface switching method. The electronic apparatus includes: a first control component corresponding to a first operating system, a second control component corresponding to a second operating system, a USB interface, and a USB interface switching circuit. The first control component is used to detect the data transmission state between the USB interface and the first control component. The second control component is used to detect the data transmission state between the USB interface and the second control component.

20 Claims, 7 Drawing Sheets

(56) References Cited

U.S. PATENT DOCUMENTS

| | | | |
|---|---|---|---|
| 2005/0045720 A1* | 3/2005 | Fruhauf | G06K 19/077 235/440 |
| 2009/0228614 A1* | 9/2009 | Hwang | H04M 1/72409 710/16 |
| 2010/0109749 A1 | 5/2010 | Chen et al. | |
| 2013/0250813 A1* | 9/2013 | Janz | H04L 41/0809 370/255 |
| 2014/0122749 A1* | 5/2014 | Ting | G06F 13/385 710/14 |
| 2015/0063134 A1* | 3/2015 | Rajkotia | H04L 12/407 370/252 |
| 2015/0227485 A1 | 8/2015 | Maung et al. | |
| 2017/0004104 A1 | 1/2017 | Meyers et al. | |

FOREIGN PATENT DOCUMENTS

| | | |
|---|---|---|
| CN | 105786728 A | 7/2016 |
| CN | 105824775 A | 8/2016 |
| CN | 108959153 A | 12/2018 |
| CN | 104516779 B | 3/2020 |
| CN | 110990321 A | 4/2020 |
| TW | 201019123 A | 5/2010 |

OTHER PUBLICATIONS

Yaxing, Shi, "Multiplexing technology for multi-channel energy spectrum systems", Electronic Measurement Technology, Nov. 2016, pp. 151-154.

International Search Report, dated Oct. 27, 2021, from PCT application No. PCT/CN2021/110669.

* cited by examiner

ELECTRONIC APPARATUS AND USB INTERFACE SWITCHING METHOD

CROSS REFERENCE TO RELATED APPLICATIONS

The present application is a US National Stage of International Application No. PCT/CN2021/110669, filed on Aug. 4, 2021, which claims the priority of the Chinese patent application No. 202010987327.8 filed to the China Patent Office on Sep. 18, 2020, and entitled "Electronic Apparatus and USB Interface Switching Method", of which the entire contents are incorporated herein by reference.

FIELD

The present disclosure relates to the field of computers, in particular to an electronic apparatus and a USB interface switching method.

BACKGROUND

At present, a commonly used conference machine or educational machine may be set up with a dual system in order to meet requirements of users in various scenarios and enrich functions. For example, an open pluggable specification (OPS) box may be added. The OPS box is inside or on the side of the conference machine. It is not very convenient to connect a universal serial bus (USB) interface, so the conference machine (or the educational machine) shares one USB interface with the OPS box. An operating system of the conference machine (or the educational machine) is generally an Android system, and an operating system of the OPS box is generally a Windows operating system. Operating interfaces of the two operating systems are both on the conference machine (or the educational machine). At present, after the operating system is switched, the USB interface may be automatically switched to a device corresponding to the operating system after switching. In this way, the problem is: if the USB interface is transmitting data when the operating system is switched, then direct switching of the USB interface will cause loss of USB data, interruption of data transmission, and destruction of a file; and if the operating system is switched after the USB interface completes data transmission, the user needs to wait for the USB data transmission being completed before switching the operating system to a required operating system, so the user waits for a long time, which affects user experience.

SUMMARY

Embodiments of the present disclosure provide an electronic apparatus and a USB interface switching method, and specific solutions are as follows.

An electronic apparatus provided by an embodiment of the present disclosure includes: a first control component corresponding to a first operating system, a second control component corresponding to a second operating system, a USB interface and a USB interface switching circuit; where:
the USB interface is connected to the first control component or the second control component via the USB interface switching circuit;
the USB interface switching circuit is configured to connect the USB interface to the first control component or the second control component;
the first control component is configured to detect a data transmission state between the USB interface and the first control component;
the second control component is configured to detect a data transmission state between the USB interface and the second control component; and
the first control component and/or the second control component is further configured to: after switching an operating system corresponding to an operating interface of the electronic apparatus, determine whether data is being transmitted between the USB interface and a control component corresponding to an operating system before switching according to a data transmission state, detected by the control component corresponding to the operating system before switching, between the USB interface and the control component corresponding to the operating system before switching; and when it is determined that there is no data transmission between the USB interface and the control component corresponding to the operating system before switching, control the USB interface switching circuit so that the USB interface is switched to be connected to a control component corresponding to an operating system after switching.

Optionally, in the electronic apparatus provided by the embodiment of the present disclosure, the first control component and/or the second control component is specifically configured to:
when it is determined that there is data transmission between the USB interface and the control component corresponding to the operating system before switching, switch the USB interface to being connected to the control component corresponding to the operating system after switching, after data transmission between the USB interface and the control component corresponding to the operating system before switching is completed; and
when it is determined that there is no data transmission between the USB interface and the control component corresponding to the operating system before switching, directly switch the USB interface to being connected to the control component corresponding to the operating system after switching.

Optionally, in the electronic apparatus provided by the embodiment of the present disclosure, the first control component is configured to start to detect the data transmission state between the USB interface and the first control component after the operating interface of the electronic apparatus is switched from the first operating system to the second operating system.

Optionally, in the electronic apparatus provided by the embodiment of the present disclosure, the second control component is configured to start to detect the data transmission state between the USB interface and the second control component after the operating interface of the electronic apparatus is switched from the second operating system to the first operating system.

Optionally, in the electronic apparatus provided by the embodiment of the present disclosure, the first control component is configured to control the USB interface switching circuit, so that the USB interface is switched to be connected to the first control component or the second control component; and
the second control component is further configured to send detected data transmission state information between the USB interface and the second control component to the first control component.

Optionally, in the electronic apparatus provided by the embodiment of the present disclosure, the second control component is configured to control the USB interface switching circuit, so that the USB interface is switched to be connected to the first control component or the second control component; and the first control component is further configured to send detected data transmission state information between the USB interface and the first control component to the second control component.

Optionally, in the electronic apparatus provided by the embodiment of the present disclosure, the data transmission state information is transmitted between the first control component and the second control component via a universal asynchronous receiver/transmitter (UART) serial interface circuit, the USB interface, or an inter-integrated circuit (I2C) interface.

Optionally, in the electronic apparatus provided by the embodiment of the present disclosure, the first control component is configured to control the USB interface switching circuit, so that the USB interface is switched to be connected to the second control component; and the second control component is configured to control the USB interface switching circuit, so that the USB interface is switched to be connected to the first control component.

Optionally, the electronic apparatus provided by the embodiment of the present disclosure further includes a display screen, the first control component and the second control component are both connected to the display screen, and the display screen is configured to display an operating interface of the first operating system or an operating interface of the second operating system.

Optionally, in the electronic apparatus provided by the embodiment of the present disclosure, the first operating system is an Android system, and the second operating system is a Windows system.

Optionally, in the electronic apparatus provided by the embodiment of the present disclosure, the USB interface switching circuit includes at least one control terminal, a first signal terminal, a second signal terminal and a third signal terminal; and the first signal terminal is connected to the USB interface, the second signal terminal is connected to the first control component, and the third signal terminal is connected to the second control component;

where the at least one control terminal is connected to a general-purpose input/output (GPIO) port of the first control component; or, the at least one control terminal is connected to a GPIO port of the second control component; or, when the USB interface switching circuit includes a plurality of control terminals, a part of the plurality of control terminals is connected to the GPIO port of the first control component, and the remaining part of the plurality of control terminals is respectively connected to the GPIO port of the second control component.

Accordingly, an embodiment of the present disclosure further provides a USB interface switching method applied to the above electronic apparatus, including:

after switching an operating system corresponding to an operating interface of the electronic apparatus, determining whether data is being transmitted between a USB interface and a control component corresponding to an operating system before switching; and until it is determined that there is no data transmission between the USB interface and the control component corresponding to the operating system before switching, controlling the USB interface switching circuit, so that the USB interface is switched to be connected to a control component corresponding to an operating system after switching.

Optionally, in the above USB interface switching method provided by the present disclosure, until it is determined that there is no data transmission between the USB interface and the control component corresponding to the operating system before switching, the controlling the USB interface switching circuit, so that the USB interface is switched to be connected to the control component corresponding to the operating system after switching specifically includes:

when it is determined that there is data transmission between the USB interface and the control component corresponding to the operating system before switching, switching the USB interface to being connected to the control component corresponding to the operating system after switching, after data transmission between the USB interface and the control component corresponding to the operating system before switching is completed;

when it is determined that there is no data transmission between the USB interface and the control component corresponding to the operating system before switching, directly switching the USB interface to being connected to the control component corresponding to the operating system after switching.

Accordingly, an embodiment of the present disclosure further provides a computer-readable nonvolatile storage medium, the computer-readable nonvolatile storage medium stores a computer executable instruction, and the computer executable instruction is configured to cause a computer to execute the above method provided by the embodiments of the present disclosure.

DETAILED DESCRIPTION OF THE EMBODIMENTS

Figure 1:
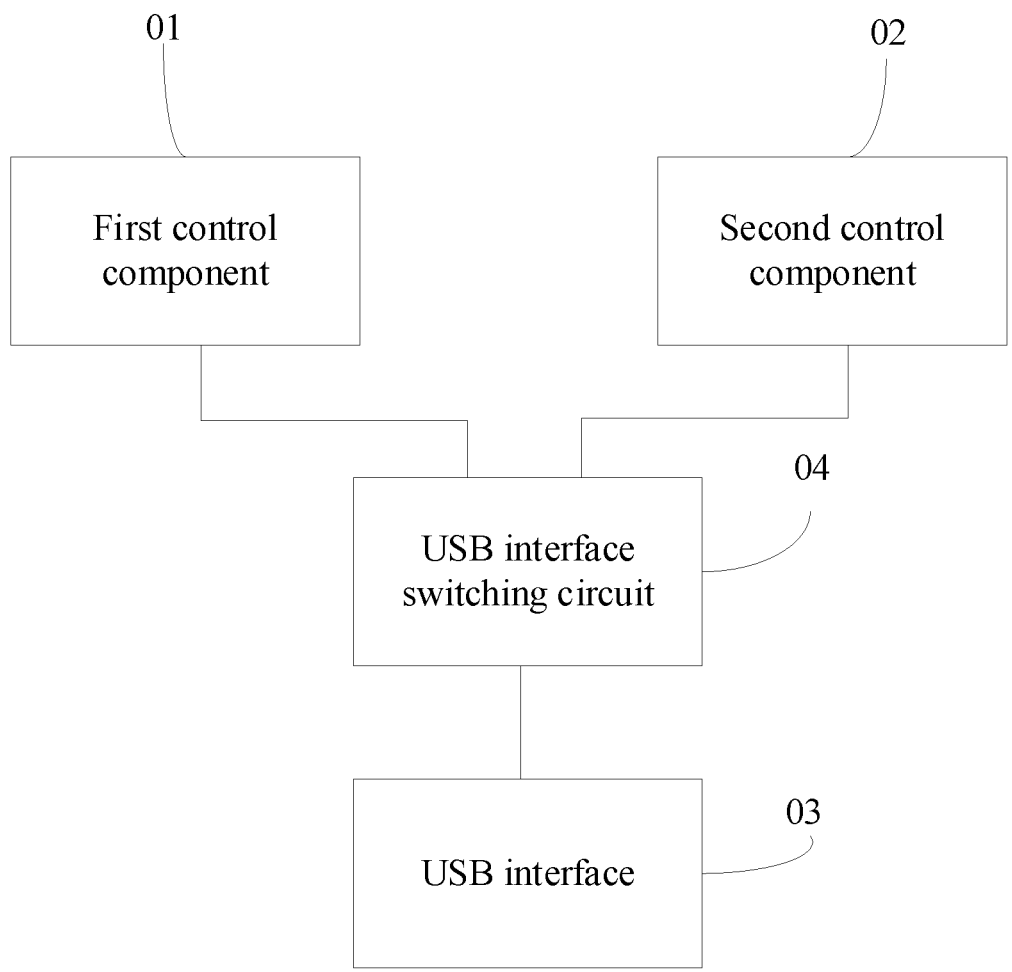
FIG. 1 is a first schematic structural diagram of an electronic apparatus provided by an embodiment of the present disclosure.

In order to make the above objects, features and advantages of the present disclosure more clearly understood, the present disclosure will be further described below with reference to accompanying drawings and embodiments. However, exemplary implementation may be implemented in various forms and should not be construed as limited to the embodiments set forth herein; rather, these implementations are provided so that the present disclosure will be more thorough and complete, and the concept of the exemplary implementation is fully conveyed to those skilled in the art. The same reference numerals in the accompanying drawings denote the same or similar structures, and thus their repeated descriptions will be omitted. The words expressing position and direction described in the present disclosure are all described by taking the accompanying drawings as an example, but changes may also be made as required, and the made changes are all contained in the protection scope of the present disclosure. The accompanying drawings of the present disclosure are only configured to illustrate a relative positional relationship and do not represent actual scales.

It should be noted that specific details are set forth in the following description in order to facilitate a thorough understanding of the present disclosure. However, the present disclosure can be implemented in various other ways different from those described here, and those skilled in the art can make similar promotions without departing from the connotation of the present disclosure. Therefore, the present disclosure is not limited by the specific implementations disclosed below. Subsequent descriptions in the specification are preferred implementations for implementing the present application. However, the descriptions are for the purpose of illustrating the general principle of the present application and are not intended to limit the scope of the present application. The protection scope of the present application should be determined by the appended claims.

An electronic apparatus and a USB interface switching method provided by embodiments of the present disclosure will be described in detail below with reference to the accompanying drawings.

An electronic apparatus provided by the embodiment of the present disclosure, as shown in FIG. 1, includes: a first control component 01 corresponding to a first operating system, a second control component 02 corresponding to a second operating system, a USB interface 03 and a USB interface switching circuit 04;

the USB interface 03 is electrically connected to the first control component 01 or the second control component 02 via the USB interface switching circuit 04;

the USB interface switching circuit 04 is configured to connect the USB interface 03 to the first control component 01 or the second control component 02;

the first control component 01 is configured to detect a data transmission state between the USB interface 03 and the first control component 01;

the second control component 02 is configured to detect a data transmission state between the USB interface 03 and the second control component 02; and the first control component 01 and/or the second control component 02 is further configured to: after switching an operating system corresponding to an operating interface of the electronic apparatus, determine whether data is being transmitted between the USB interface 03 and a control component corresponding to an operating system before switching according to a data transmission state, detected by the control component corresponding to the operating system before switching, between the USB interface 03 and the control component corresponding to the operating system before switching; and until it is determined that there is no data transmission between the USB interface 03 and the control component corresponding to the operating system before switching, control the USB interface switching circuit 04 so that the USB interface 03 is switched to be connected to a control component corresponding to an operating system after switching.

According to the above electronic apparatus provided by the embodiment of the present disclosure, after switching the operating system of the electronic apparatus, whether data is being transmitted between the USB interface and the control component corresponding to the operating system before switching may be determined according to the data transmission state, detected by the control component corresponding to the operating system before switching, between the USB interface and the control component corresponding to the operating system before switching; and until it is determined that there is no data transmission between the USB interface and the control component corresponding to the operating system before switching, the USB interface switching circuit is controlled so that the USB interface is switched to be connected to the control component corresponding to the operating system after switching. In this way, the transmission data of the USB interface can be protected, and the operating interface can be switched without waiting, thereby improving user experience.

Optionally, according to the above electronic apparatus provided by the embodiment of the present disclosure, the first control component and/or the second control component is specifically configured to: when it is determined that there is data transmission between the USB interface and the control component corresponding to the operating system before switching, switch the USB interface to being connected to the control component corresponding to the operating system after switching, after data transmission between the USB interface and the control component corresponding to the operating system before switching is completed; and when it is determined that there is no data transmission between the USB interface and the control component corresponding to the operating system before switching, directly switch the USB interface to being connected to the control component corresponding to the operating system after switching.

The above electronic apparatus provided by the embodiment of the present disclosure may be any electronic apparatus, including the first control component and the second control component which have different operating systems and need to share the USB interface. For example, the electronic apparatus is an educational machine or a conference machine; the first control component may include a system on a chip (SOC), a memory, a direct-current power supply, a high definition multimedia interface (HDMI), etc.; and the second control component is an OPS box, which is not limited here.

Figure 2:
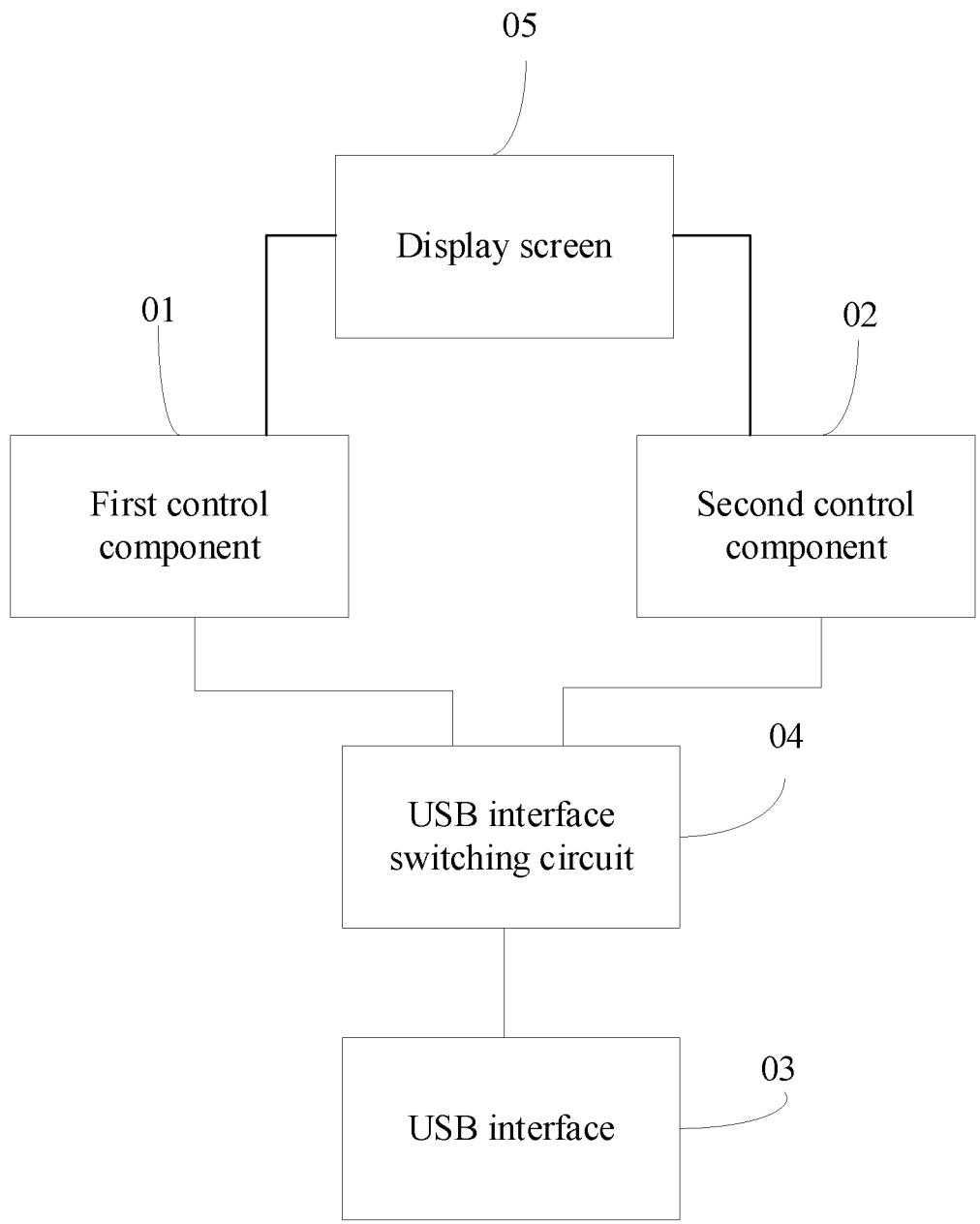
FIG. 2 is a second schematic structural diagram of an electronic apparatus provided by an embodiment of the present disclosure.

During specific implementation, the electronic apparatus provided by the embodiment of the present disclosure, as shown in FIG. 2, further includes a display screen 05, the first control component 01 and the second control component 02 are both connected to the display screen 05, and the display screen 05 is configured to display an operating interface of the first operating system or an operating interface of the second operating system.

During specific implementation, the first control component and the display screen may be connected via a low-voltage differential signaling (LVDS) line, the second control component and the display screen may also be connected via the LVDS line, and the first control component and the second control component may be connected via an HDMI line.

Optionally, in the electronic apparatus provided by the embodiment of the present disclosure, the first control component is a main control component, the second control component is an auxiliary control component, and the operating interfaces of the first operating system and the second operating system are both displayed on the display screen. After the main control component is powered on, the first operating system is started, the operating interface displayed on the display screen is the first operating system, and the main control component controls the USB interface switching circuit to connect the USB interface to the main control component, that is, when the main control component is powered on, the USB interface is connected to the main control component by default. When the second operating system needs to be started, the second operating system may be started by controlling the second control component via the first control component under the operating interface of the first operating system displayed on the display screen. Of course, a starting key is set on the second control component to control starting of the second operating system by directly triggering the starting key.

After the second operating system is started, when the operating interface of the operating system displayed on the display screen is switched to the second operating system, the first control component and/or the second control component may determine whether data is being transmitted between the USB interface and the main control component; when there is data transmission, the USB interface switching circuit is controlled after data transmission is completed, so that the USB interface is switched to be connected to the auxiliary control component; and when there is no data transmission, the USB interface switching circuit is directly controlled so that the USB interface is switched to be connected to the auxiliary control component. When the operating interface of the operating system displayed on the display screen is switched to the first operating system, the first control component and/or the second control component may determine whether data is being transmitted between the USB interface and the auxiliary control component; when there is data transmission, the USB interface switching circuit is controlled after data transmission is completed, so that the USB interface is switched to be connected to the main control component; and when there is no data transmission, the USB interface switching circuit is directly controlled so that the USB interface is switched to be connected to the main control component. Therefore, the transmission data of the USB interface can be protected, and the operating system can be switched without waiting, thereby improving the user experience.

During specific implementation, in the embodiment of the present disclosure, each control component may start to detect the data transmission state between the control component and the USB interface after being connected to the USB interface, and stop detecting until the connection between the control component and the USB interface is disconnected. For example, the first control component starts to detect the data transmission state between the first control component and the USB interface after being connected to the USB interface, and stops detecting until the connection between the first control component and the USB interface is disconnected; and the second control component starts to detect the data transmission state between the second control component and the USB interface after being connected to the USB interface, and stops detecting until the connection between the second control component and the USB interface is disconnected.

Optionally, in the electronic apparatus provided by the embodiment of the present disclosure, the first control component is configured to start to detect the data transmission state between the USB interface and the first control component after the operating interface displayed on the display screen is switched from the first operating system to the second operating system, so as to reduce computing power of the first control component.

Similarly, optionally, in the electronic apparatus provided by the embodiment of the present disclosure, the second control component is configured to start to detect the data transmission state between the USB interface and the second control component after the operating interface displayed on the display screen is switched from the second operating system to the first operating system, so as to reduce computing power of the second control component.

Optionally, in the electronic apparatus provided by the embodiment of the present disclosure, the first operating system is an Android system, and an underlying layer of the first operating system may send and receive byte type (Byte) data (namely USB data) through a USB standard interface function (Public Void). As long as the first control component can read the Byte data, it means that there is data transmission between the first control component and the USB interface; and if the Byte data cannot be read, it means that there is no data transmission between the first control component and the USB interface.

Optionally, in the electronic apparatus provided by the embodiment of the present disclosure, the second operating system is a Windows system; and by calling an application programming interface (API) function in the Windows system, the second control component may obtain a unique identifier of the USB interface so as to obtain the USB interface and then read the data of the USB interface. If the USB interface is transmitting data, the data can be read; and if the USB interface has no data being transmitted, the data cannot be read.

Optionally, in the electronic apparatus provided by the embodiment of the present disclosure, the first control component is configured to control the USB interface switching circuit, so that the USB interface is switched to be connected to the first control component or the second control component; and the second control component is configured to send detected data transmission state information between the USB interface and the second control component to the first control component. In this way, after the operating interface displayed on the display screen is switched from the second operating system to the first operating system, the second control component is required to send the detected data transmission state information between the USB interface and the second control component to the first control component, so that the USB interface switching circuit is controlled by the first control component. While after the operating interface displayed on the display screen is switched from the first operating system to the second operating system, it is the first control component that detects the data transmission state between the USB interface and the first control component. Because the first control component is controlling the USB interface switching circuit, the first control component does not need to send the data transmission state information to the second control component.

During specific implementation, the first control component is connected to the USB interface switching circuit via a general-purpose input/output (GPIO) port.

Optionally, in the electronic apparatus provided by the embodiment of the present disclosure, the second control component is configured to control the USB interface switching circuit, so that the USB interface is switched to be connected to the first control component or the second control component; and the first control component is further configured to send detected data transmission state information between the USB interface and the first control component to the second control component. In this way, after the electronic apparatus is switched from the first operating system to the second operating system, the first control component is required to send the detected data transmission state information between the USB interface and the first control component to the second control component, so that the USB interface switching circuit is controlled by the second control component. While after the operating interface displayed on the display screen is switched from the second operating system to the first operating system, it is the second control component that detects the data transmission state between the USB interface and the second control component. Because the second control component is controlling the USB interface switching circuit, the second control component does not need to send the data transmission state information to the first control component.

During specific implementation, the second control component is connected to the USB interface switching circuit via the GPIO port.

Optionally, in the electronic apparatus provided by the embodiment of the present disclosure, the data transmission state information may be transmitted between the first control component and the second control component via a universal asynchronous receiver/transmitter (UART) serial interface circuit, the USB interface, or an inter-integrated circuit (I2C) interface, which is not limited here.

Figure 3:
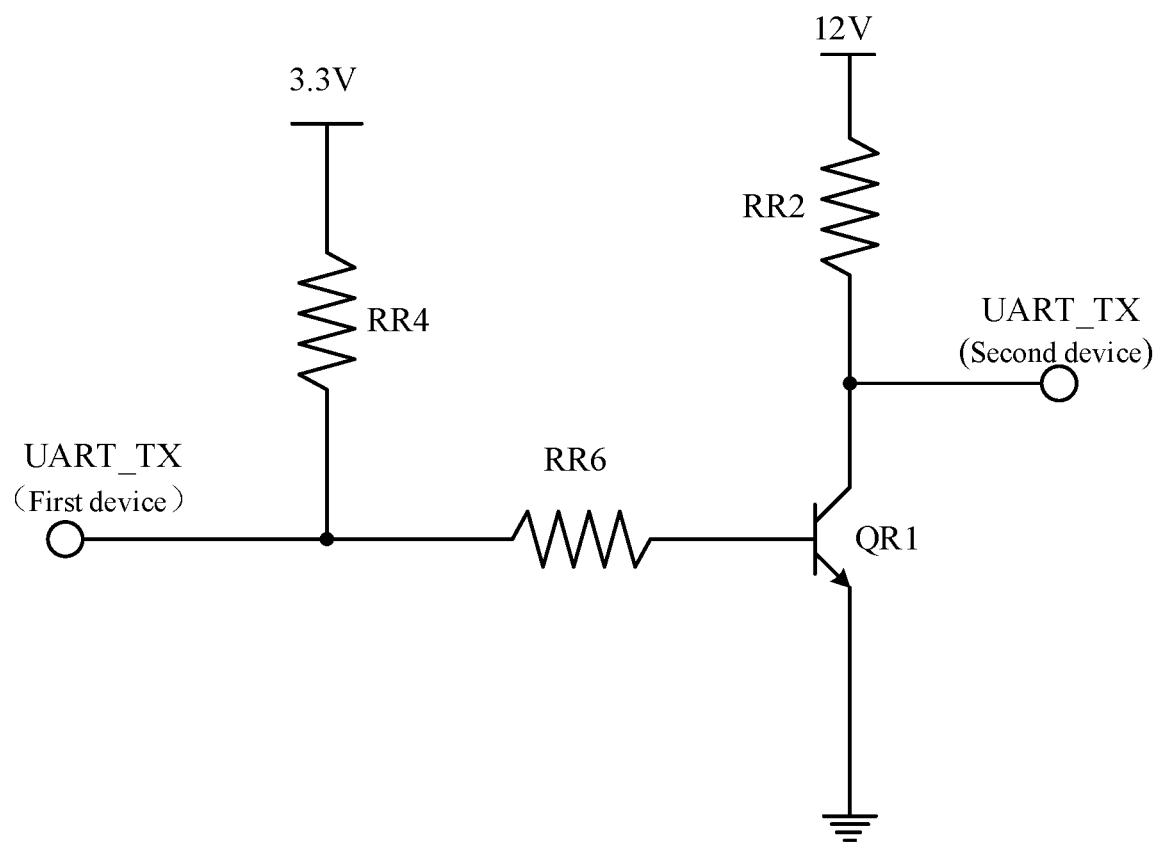
FIG. 3 is a first schematic diagram of a local structure of a UART serial interface circuit provided by an embodiment of the present disclosure.
Figure 4:
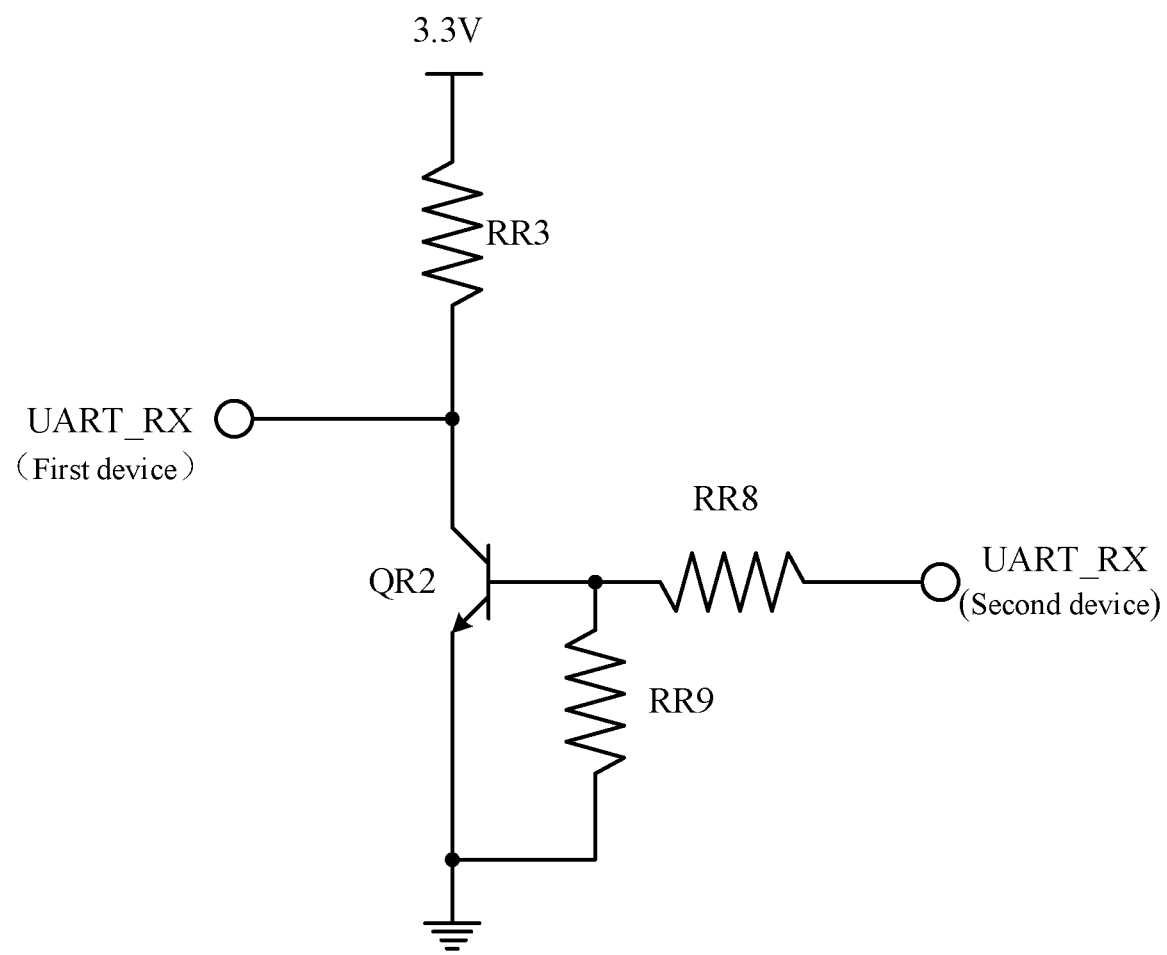
FIG. 4 is a second schematic diagram of a local structure of a UART serial interface circuit provided by an embodiment of the present disclosure.

Specifically, a condition that the first operating system is an Android system, and the second operating system is a Windows system is taken as an example. A UART serial interface circuit is used for data interaction between the first control component and the second control component, such as an RS232 UART serial interface circuit. When the first control component sends data to the second control component, as shown in FIG. 3, in the UART serial interface circuit, a resistance value of a resistor RR4 is about 10 KΩ which plays a pull-up role; a resistance value of a resistor RR6 is about 10 KΩ which plays a role of current limiting; and a resistance value of a resistor RR2 is about 10 KΩ. A bipolar junction transistor QR1 is an NPN-type transistor, a level of one end of the UART serial interface circuit connected to the first control component is 3.3 V, and a level of one end of the UART serial interface circuit connected to the second control component is 12 V. When the first control component receives the data sent by the second control component, as shown in FIG. 4, in the UART serial interface circuit, a resistance value of a resistor RR3 is about 10 KΩ which plays a pull-up role; and resistance values of a resistor RR8 and a resistor RR9 are about 10 KΩ which play a role of current limiting and voltage dividing. A bipolar junction transistor QR2 is an NPN-type transistor, a level of one end of the UART serial interface circuit connected to the first control component is 3.3 V, and a level of one end of the UART serial interface circuit connected to the second control component is 12 V.

During specific implementation, the UART serial interface circuit may be set on the first control component, and the second control component is connected to the UART serial interface circuit via a signal line, so that the data transmission state information is transmitted between the first control component and the second control component via the UART serial interface circuit.

Optionally, in the electronic apparatus provided by the embodiment of the present disclosure, the first control component is configured to control the USB interface switching circuit, so that the USB interface is switched to be connected to the second control component; and the second control component is configured to control the USB interface switching circuit, so that the USB interface is switched to be connected to the first control component. In this way, after the operating interface displayed on the display screen is switched from the second operating system to the first operating system, it is the second control component to detect the data transmission state between the USB interface and the second control component, therefore the second control component does not need to send the data transmission state information to the first control component, and the second control component directly controls the USB interface switching circuit, so that the USB interface is switched to be connected to the first control component. After the operating interface displayed on the display screen is switched from the first operating system to the second operating system, it is the first control component to detect the data transmission state between the USB interface and the first control component, therefore the first control component does not need to send the data transmission state information to the second control component, and the first control component directly controls the USB interface switching circuit, so that the USB interface is switched to be connected to the second control component.

During specific implementation, the first control component is connected to the USB interface switching circuit via the GPIO port, and the second control component is connected to the USB interface switching circuit via the GPIO port.

Optionally, in the electronic apparatus provided by the embodiment of the present disclosure, the USB interface switching circuit includes at least one control terminal, a first signal terminal, a second signal terminal and a third signal terminal. The first signal terminal is connected to the USB interface, the second signal terminal is connected to the first control component, and the third signal terminal is connected to the second control component. The at least one control terminal is connected to a GPIO port of the first control component. Or, the at least one control terminal is connected to a GPIO port of the second control component. Or, when the USB interface switching circuit includes a plurality of control terminals, a part of the plurality of control terminals is connected to the GPIO port of the first control component, and the remaining part of the plurality of control terminals is respectively connected to the GPIO port of the second control component.

Figure 5:
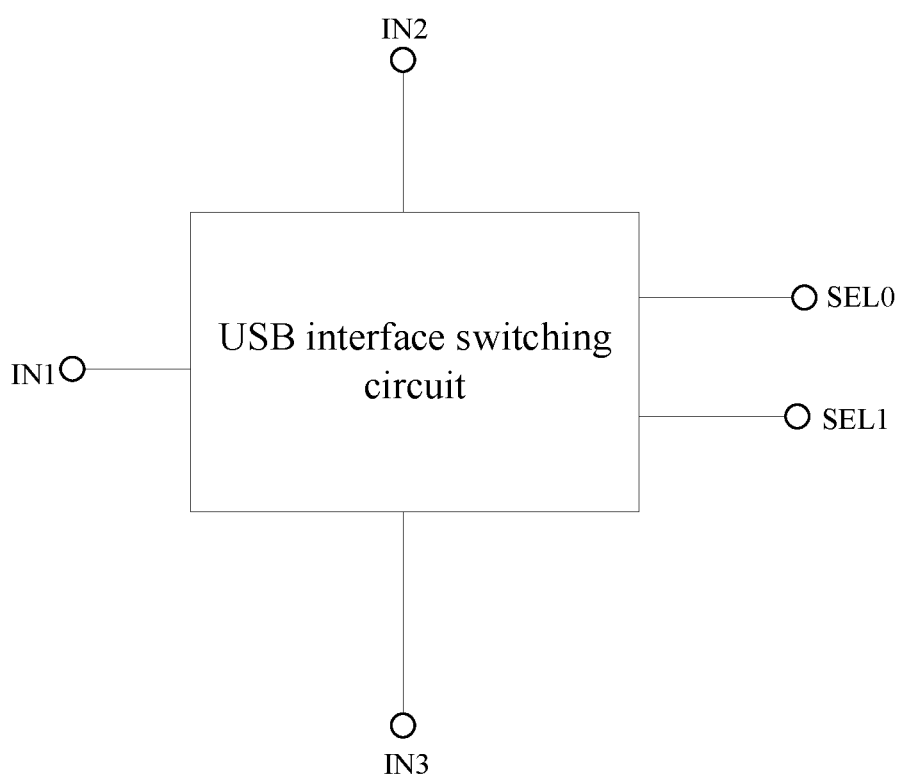
FIG. 5 is a first schematic structural diagram of a USB interface switching circuit provided by an embodiment of the present disclosure.

Taking the USB interface switching circuit including the two control terminals as an example, as shown in FIG. 5, a structure of the USB interface switching circuit may include a first control terminal SEL0 and a second control terminal SEL1, a first signal terminal IN1 connected to the USB interface, a second signal terminal IN2 connected to the first control component, and a third signal terminal IN3 connected to the second control component. The USB interface switching circuit utilizes the first control terminal SEL0 and the second control terminal SEL1 to control whether the first signal terminal IN1 is connected to the second signal terminal IN2 or connected to the third signal terminal IN3. The first control terminal SEL0 and the second control terminal SEL1 are both connected to the GPIO port of the first control component, or the first control terminal SEL0 and the second control terminal SEL1 are both connected to the GPIO port of the second control component, or the first control terminal SEL0 and the second control terminal SEL1 are respectively connected to the GPIO port of the first control component and the GPIO port of the second control component. The first signal terminal IN1 is connected to the USB interface, the second signal terminal IN2 is connected to the first control component, and the third signal terminal IN3 is connected to the second control component. A logic state corresponding to the USB interface switching circuit may be shown in Table 1 below.

TABLE 1

| SEL0 | SEL1 | IN2 | IN3 |
|------|------|-----|-----|
| 0 | 0 | OFF | OFF |
| 0 | 1 | ON | OFF |
| 1 | 0 | OFF | ON |
| 1 | 1 | OFF | OFF |

Figure 6:
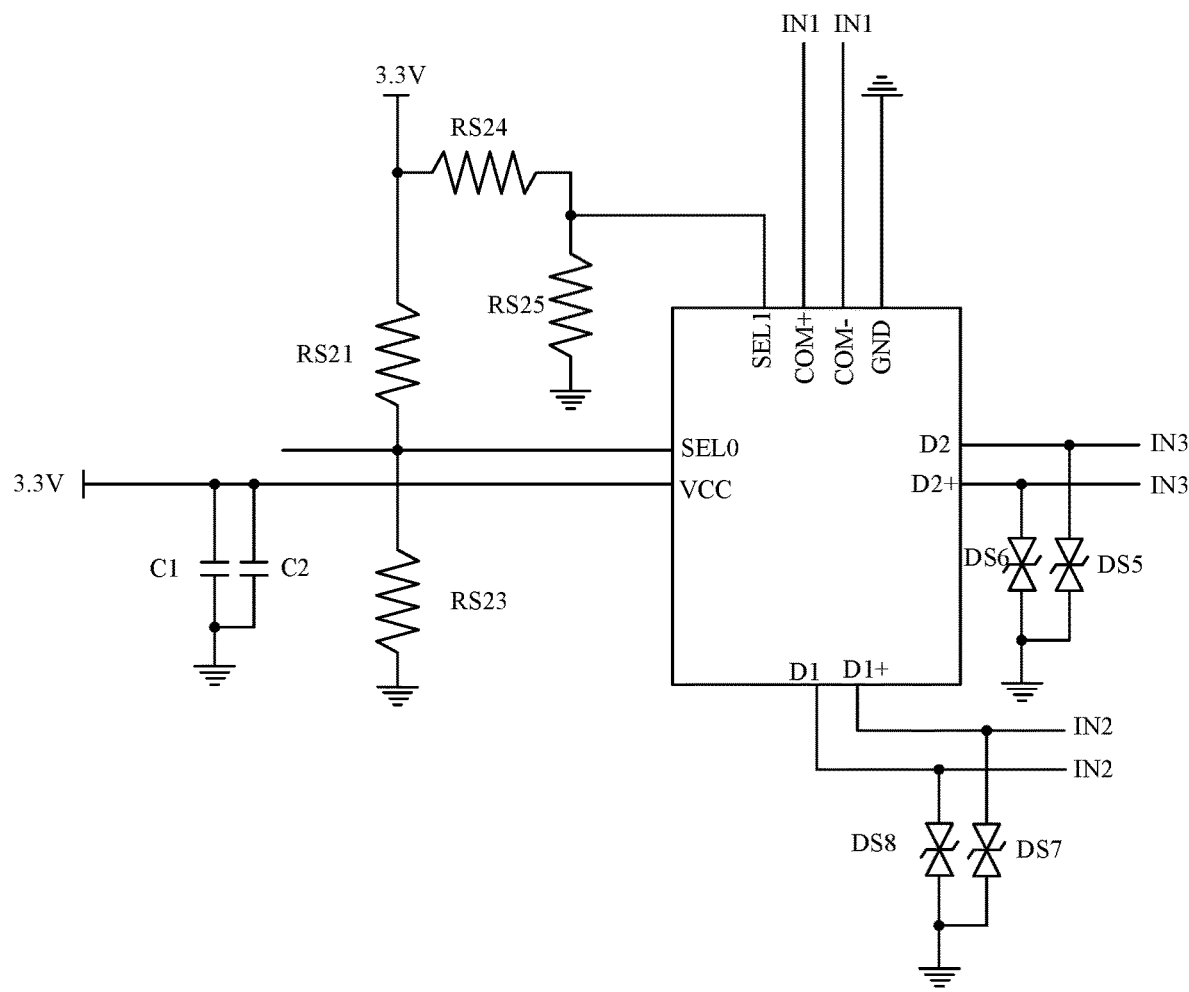
FIG. 6 is a second schematic structural diagram of a USB interface switching circuit provided by an embodiment of the present disclosure.

During specific implementation, when the USB interface switching circuit includes one control terminal, a specific structure of the USB interface switching circuit may be referred to FIG. 6, and may further include filter capacitors C1 and C2, resistors RS21, RS23, RS24 and RS25, a pair of transient voltage suppressors DS7 and DS8 located at the signal terminal IN2, and a pair of transient voltage suppressors DS5 and DS6 located at the signal terminal IN3.

Figure 7:
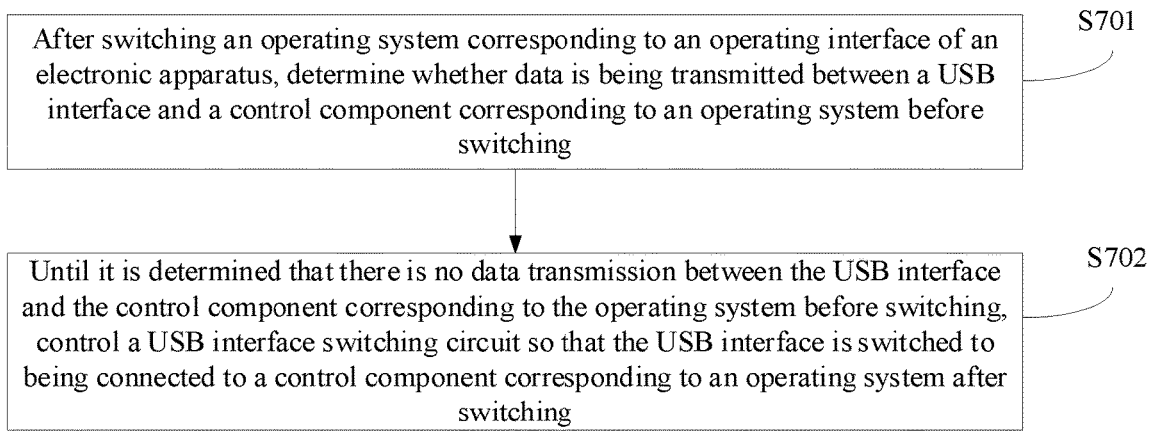
FIG. 7 is a first flow diagram of a USB interface switching method provided by an embodiment of the present disclosure.

Based on the same inventive concept, an embodiment of the present disclosure further provides a USB interface switching method applied to any of the above electronic apparatus, as shown in FIG. 7, including the following.

S701, after switching an operating system corresponding to an operating interface of the electronic apparatus, whether data is being transmitted between a USB interface and a control component corresponding to an operating system before switching is determined.

S702, until it is determined that there is no data transmission between the USB interface and the control component corresponding to the operating system before switching, the USB interface switching circuit is controlled, so that the USB interface is switched to be connected to a control component corresponding to an operating system after switching.

According to the above USB interface switching provided by the embodiment of the present disclosure, after switching the operating system, whether the data is being transmitted between the USB interface and the control component corresponding to the operating system before switching may be determined according to the data transmission state, detected by the control component corresponding to the operating system before switching, between the USB interface and the control component corresponding to the operating system before switching; and until it is determined that there is no data transmission between the USB interface and the control component corresponding to the operating system before switching, the USB interface switching circuit is controlled so that the USB interface is switched to be connected to the control component corresponding to the operating system after switching. In this way, the transmission data of the USB interface can be protected, and the operating system can be switched without waiting, thereby improving user experience.

Figure 8:
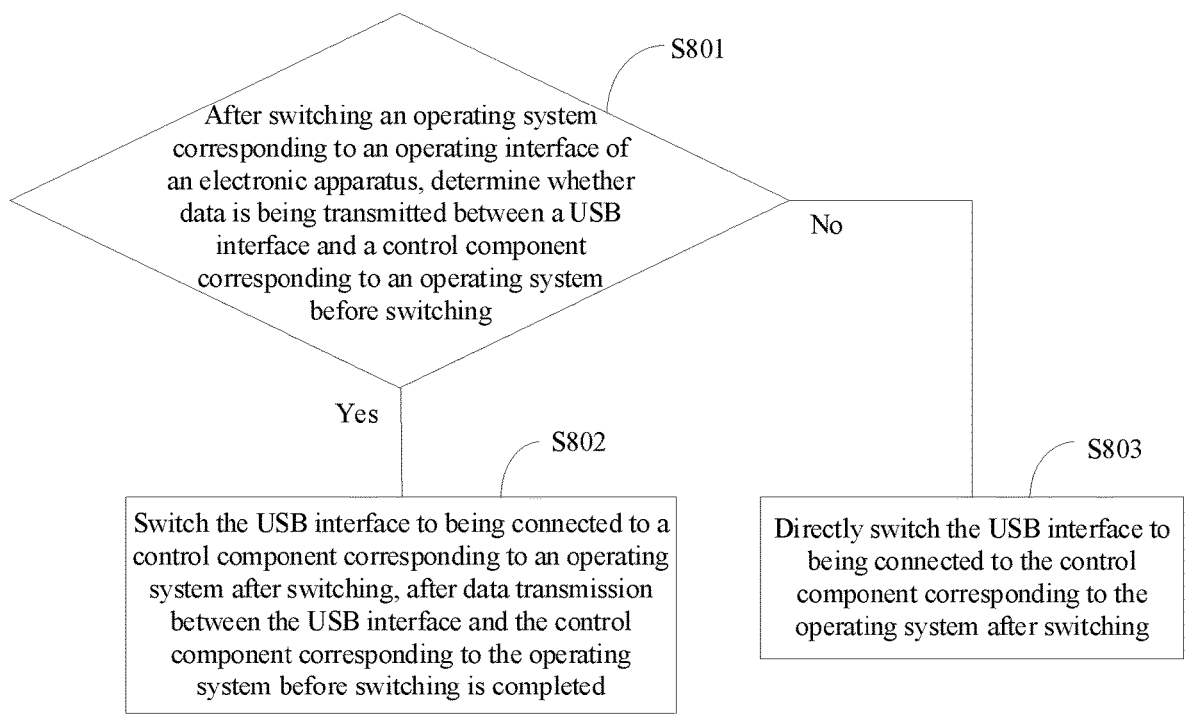
FIG. 8 is a second flow diagram of a USB interface switching method provided by an embodiment of the present disclosure.

Optionally, the USB interface switching method provided in the present application, as shown in FIG. 8, specifically includes the following.

S801, after switching an operating system corresponding to an operating interface of an electronic apparatus, whether data is being transmitted between a USB interface and a control component corresponding to an operating system before switching is determined. If yes, step S802 is executed. If no, step S803 is executed.

S802, the USB interface is switched to be connected to the control component corresponding to the operating system after switching, after data transmission between the USB interface and the control component corresponding to the operating system before switching is completed.

S803, the USB interface is directly switched to be connected to the control component corresponding to the operating system after switching.

Based on the same inventive concept, an embodiment of the present disclosure provides a computer-readable nonvolatile storage medium, the computer-readable nonvolatile storage medium stores a computer executable instruction, and the computer executable instruction is configured to cause a computer to execute any of the above method provided by the embodiment of the present disclosure.

Those skilled in the art should understand that the embodiments of the present application may be provided as methods, systems or computer program products. Therefore, the present application can adopt forms of full hardware embodiments, full software embodiments, or embodiments combining software and hardware aspects. Moreover, the present application can adopt a form of the computer program products implemented on one or more computer available storage mediums (including but not limited to a disk memory, an optical memory and the like) containing computer available program codes.

The present application is described with reference to flow diagrams and/or block diagrams of the methods, the devices (systems), and computer program products according to the embodiments of the present application. It should be understood that each flow and/or block in the flow diagrams and/or the block diagrams and combinations of the flows and/or the blocks in the flow diagrams and/or the block diagrams can be implemented by computer program instructions. These computer program instructions may be provided to a processor of a general-purpose computer, a special-purpose computer, an embedded processing machine or other programmable data processing devices to generate a machine, such that the instructions, when executed by the processor of the computer or other programmable data processing devices, generate an apparatus for implementing functions specified in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generates an article of manufacture that includes a commander apparatus that implement the functions specified in one or more flows in the flow diagrams and/or one or more blocks in the block diagrams.

These computer program instructions may also be loaded to the computer or other programmable data processing devices, so that a series of operating steps are executed on the computer or other programmable devices to generate computer-implemented processing, such that the instructions executed on the computer or other programmable devices provide steps for implementing the functions specified in one or more flows in the flow diagrams and/or one or more blocks in the block diagrams.

Although the preferred embodiments of the present disclosure have been described, those skilled in the art can make additional modifications and variations on these embodiments once they know the basic creative concept. Therefore, the appended claim intends to be explained as including the preferred embodiments and all modifications and variations falling within the scope of the present disclosure.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. An electronic apparatus, comprising:
   a first control component corresponding to a first operating system;
   a second control component corresponding to a second operating system;
   a USB interface; and
   a universal serial bus (USB) interface switching circuit;
   wherein the USB interface switching circuit is configured to connect the USB interface to the first control component or the second control component;
   the first control component is configured to detect a data transmission state between the USB interface and the first control component;
   the second control component is configured to detect a data transmission state between the USB interface and the second control component; and
   the first control component and/or the second control component is further configured to:
      after switching an operating system corresponding to an operating interface of the electronic apparatus, determine a data transmission state between the USB interface and a control component corresponding to an operating system before switching; and
      when it is determined that the data transmission state between the USB interface and the control component corresponding to the operating system before switching is that no data is being transmitted, control the USB interface switching circuit to make the USB interface be switched to be connected to a control component corresponding to an operating system after switching.

2. The electronic apparatus according to claim 1, wherein the first control component and/or the second control component is specifically configured to:
   when it is determined that the data transmission state between the USB interface and the control component corresponding to the operating system before switching is that data is being transmitted, switch the USB interface to being connected to the control component corresponding to the operating system after switching, after data transmission between the USB interface and the control component corresponding to the operating system before switching is completed;
   when it is determined that the data transmission state between the USB interface and the control component corresponding to the operating system before switching is that no data is being transmitted, directly switch the USB interface to being connected to the control component corresponding to the operating system after switching.

3. The electronic apparatus according to claim 2, further comprising a display screen;
   wherein the first control component and the second control component are both connected to the display screen, and the display screen is configured to display an operating interface of the first operating system or an operating interface of the second operating system.

4. The electronic apparatus according to claim 2, wherein the first operating system is an Android system, and the second operating system is a Windows system.

5. The electronic apparatus according to claim 1, wherein the first control component is configured to start to detect the data transmission state between the USB interface and the first control component after the operating interface of the electronic apparatus is switched from the first operating system to the second operating system.

6. The electronic apparatus according to claim 5, further comprising a display screen;
   wherein the first control component and the second control component are both connected to the display screen, and the display screen is configured to display an operating interface of the first operating system or an operating interface of the second operating system.

7. The electronic apparatus according to claim 5, wherein the first operating system is an Android system, and the second operating system is a Windows system.

8. The electronic apparatus according to claim 1, wherein the second control component is configured to start to detect the data transmission state between the USB interface and the second control component after the operating interface of the electronic apparatus is switched from the second operating system to the first operating system.

9. The electronic apparatus according to claim 1, wherein the first control component is configured to control the USB interface switching circuit to make the USB interface be switched to be connected to the first control component or the second control component; and
   the second control component is further configured to send detected data transmission state information between the USB interface and the second control component to the first control component.

10. The electronic apparatus according to claim 9, wherein the data transmission state information is transmitted between the first control component and the second control component via a universal asynchronous receiver/transmitter (UART) serial interface circuit, the USB interface, or an inter-integrated circuit (I2C) interface.

11. The electronic apparatus according to claim 1, wherein the second control component is configured to control the USB interface switching circuit to make the USB interface be switched to be connected to the first control component or the second control component; and
   the first control component is further configured to send detected data transmission state information between the USB interface and the first control component to the second control component.

12. The electronic apparatus according to claim 11, wherein the data transmission state information is transmitted between the first control component and the second control component via a UART serial interface circuit, the USB interface, or an I2C interface.

13. The electronic apparatus according to claim 1, wherein the first control component is configured to control the USB interface switching circuit to make the USB interface be switched to be connected to the second control component; and the second control component is configured to control the USB interface switching circuit to make the USB interface be switched to be connected to the first control component.

14. The electronic apparatus according to claim 1, further comprising a display screen;
wherein the first control component and the second control component are both connected to the display screen, and the display screen is configured to display an operating interface of the first operating system or an operating interface of the second operating system.

15. The electronic apparatus according to claim 1, wherein the first operating system is an Android system, and the second operating system is a Windows system.

16. The electronic apparatus according to claim 1, wherein the USB interface switching circuit comprises at least one control terminal, a first signal terminal, a second signal terminal and a third signal terminal; and
the first signal terminal is connected to the USB interface, the second signal terminal is connected to the first control component, and the third signal terminal is connected to the second control component;
wherein the at least one control terminal is connected to a general-purpose input/output (GPIO) port of the first control component; or,
the at least one control terminal is connected to a GPIO port of the second control component; or,
when the USB interface switching circuit comprises a plurality of control terminals, a part of the plurality of control terminals is connected to the GPIO port of the first control component, and a remaining part of the plurality of control terminals is respectively connected to the GPIO port of the second control component.

17. A USB interface switching method applied to the electronic apparatus according to claim 1, comprising:
after switching the operating system corresponding to the operating interface of the electronic apparatus, determining the data transmission state between the USB interface and the control component corresponding to the operating system before switching; and
until it is determined that the data transmission state between the USB interface and the control component corresponding to the operating system before switching is that no data is being transmitted, controlling the USB interface switching circuit to make the USB interface be switched to be connected to the control component corresponding to the operating system after switching.

18. The USB interface switching method according to claim 17, wherein until it is determined that the data transmission state between the USB interface and the control component corresponding to the operating system before switching is that no data is being transmitted, the controlling the USB interface switching circuit to make the USB interface be switched to be connected to the control component corresponding to the operating system after switching specifically comprises:
when it is determined that the data transmission state between the USB interface and the control component corresponding to the operating system before switching is that data is being transmitted, switching the USB interface to being connected to the control component corresponding to the operating system after switching, after data transmission between the USB interface and the control component corresponding to the operating system before switching is completed;
when it is determined that the data transmission state between the USB interface and the control component corresponding to the operating system before switching is that no data is being transmitted, directly switching the USB interface to being connected to the control component corresponding to the operating system after switching.

19. A computer-readable nonvolatile storage medium, wherein the computer-readable nonvolatile storage medium stores a computer executable instruction, and the computer executable instruction is configured to cause a computer to execute the method according to claim 18.

20. A computer-readable nonvolatile storage medium, wherein the computer-readable nonvolatile storage medium stores a computer executable instruction, and the computer executable instruction is configured to cause a computer to execute the method according to claim 17.

* * * * *

UNITED STATES PATENT AND TRADEMARK OFFICE
CERTIFICATE OF CORRECTION

PATENT NO. : 11,921,663 B2  
APPLICATION NO. : 17/995146  
DATED : March 5, 2024  
INVENTOR(S) : Zejian Hu Page 1 of 1

It is certified that error appears in the above-identified patent and that said Letters Patent is hereby corrected as shown below:

On the Title Page

Item (71) Applicants should read: -- K-TRONICS (SUZHOU) TECHNOLOGY CO., LTD., Jiangsu (CN); BOE Technology Group Co., Ltd., Beijing (CN) --

Signed and Sealed this  
Thirteenth Day of August, 2024

Katherine Kelly Vidal  
*Director of the United States Patent and Trademark Office*